United States Patent
Bernstein et al.

[15] 3,687,961
[45] Aug. 29, 1972

[54] 8-FLUORO-2-[3-(4-FLUOROPHENYLANILINOPROPYL]-GAMMA-CARBOLINE

[72] Inventors: Edith Bernstein; David Lyon Garmaise, both of Montreal, Canada; Nicholas Peter Plotnikoff, Lake Bluff, Ill.

[73] Assignee: Abbott Laboratories, North Chicago, Ill.

[22] Filed: May 3, 1971

[21] Appl. No.: 139,902

[52] U.S. Cl............260/296 A, 260/295 S, 424/263, 424/266
[51] Int. Cl..............................................C07d 31/42
[58] Field of Search.......................260/295 S, 296 A

[56] References Cited

UNITED STATES PATENTS

| | | |
|---|---|---|
| 3,382,250 | 5/1968 | Johnson et al.........260/296 A |
| 3,448,114 | 6/1969 | Johnson et al.........260/296 A |
| 3,466,293 | 9/1969 | Johnson et al..........260/294.9 |

*Primary Examiner*—Alan L. Rotman
*Attorney*—Robert L. Niblack

[57] ABSTRACT

8-Fluoro-2-[3-(4-fluorophenylanilino)propyl]-1,2,3,4,-tetrahydro-5H-pyrido[4,3-b]indole has been found to be a very useful tranquilizer at low dosages when administered to warm-blooded animals. The new compound and its non-toxic acid addition salts have an oral $ED_{50}$ of about 20 mg./kg. and an oral $LD_{50}$ of 700 mg./kg.

2 Claims, No Drawings

8-FLUORO-2-[3-(4-FLUOROPHENYLANILINOPROPYL]-GAMMA-CARBOLINE

DETAILED DESCRIPTION OF THE INVENTION

8-Fluoro-2-[3-(4-fluorophenylanilino)propyl]-1,2,3,4-tetrahydro-5H-pyrido[4,3-b]indole, more commonly and hereinbelow simply referred to as 8-fluoro-2-[3-(4-fluorophenylanilino)propyl]-γ-carboline and its non-toxic acid addition salts has been discovered to have strong tranquilizing activity at doses representing only a small fraction of an amount that would show any toxic manifestations. The new compound has an oral therapeutic index of about 35 and can be administered easily in the form of the free base or in form of a non-toxic acid addition salt thereof.

The new compound can easily be prepared in satisfactory yield by heating 8-fluoro-γ-carboline hydrochloride with N-(3-halopropyl)-p-fluoroaniline in the presence of an acid acceptor in a suitable solvent. The reaction mixture diluted with water can be extracted with a suitable water-immiscible solvent in which the new compound is soluble. The free base so obtained can be converted to suitable salts by standard methods and, if desired, the conversion to a suitable salt may be used for the purification of the free base that can be obtained from the salt.

As illustrated but without intent to limit the present invention, reference is made to the following detailed example:

EXAMPLE

A mixture of 4.05 g. of 8-fluoro-γ-carboline hydrochloride, 4.4g. of N-(3-bromopropyl)-p-fluoroaniline, 5 g. of anhydrous potassium carbonate and 3g. of potassium iodide was heated and stirred in 50 ml. of dimethylformamide at 80° C. for 7 hours. The reaction mixture was subsequently cooled and poured into water and extracted therefrom with chloroform and the chloroform extract was washed with water, dried over magnesium sulfate and evaporated to dryness. The crude product was converted to the dihydrochloride and the obtained slat was recrystallized from ethanol to produce 4.7 g. (65 percent of theory) of 8-fluoro-2-[3-(4-fluorophenylanilino)propyl]-γ-carboline dihydrochloride melting at 178°–182° C. For analytical purposes, the dipicrate salt was prepared from the free base and picric acid in aqueous solution at pH 1. This salt melts at 139°–142° C.

The above compound was tested in mice by the method published by Psychopharmacology by the U.S. Public Health Service (Publication No. 1836 of 1968, Section 11 on Psychiatric Agents). In this test, the animals were given a 1% wt./vol. suspension of the compound in 0.3% wt./vol. tragacanth by gavage. The animals were subcutaneously administered at the same time a 1.0% aqueous solution of methamphetamine hydrochloride at a dose of 3 mg./kg. The animals were then placed in motor activity chambers equipped with photocells which were connected to counting devices with three animals per chamber and three chambers per dose level. In each instance, a control group of three animals receiving no test drug was also tested. At a dose of 5 mg./kg., the test showed a reduction of 13 percent of activity over the control animals; at doses of 10, 20 and 50 mg./kg., the corresponding reductions were 30 percent, 46 percent and 73 percent, respectively. By administering the above compound intraperitoneally at a dose 50 mg./kg., activity of the animals was reduced by 97 percent over the control group.

Although the above example shows the activity only for the dihydrochloride salt, similar results are obtained when the free base is used per se or when converted to other non-toxic acid addition salts such as the sulfate, phosphate, acetate, tartrate, citrate or succinate.

We claim:
1. 8-Fluoro-2-[3-(4-fluorophenylanilino)propyl]-1,2,3,4-tetrahydro-5H-pyrido[4,3-b]indole or a non-toxic acid addition salt thereof.
2. 8-Fluoro-2-[3-(4-fluorophenylanilino)propyl]-1,2,3,4-tetrahydro-5H-pyrido[4,3-b]indole dihydrochloride.

* * * * *

UNITED STATES PATENT OFFICE
CERTIFICATE OF CORRECTION

Patent No. 3,687,961    Dated August 29, 1972

Inventor(s) Edith Bernstein, David Lyon Garmaise and Nicholas Peter Plotnikoff

It is certified that error appears in the above-identified patent and that said Letters Patent are hereby corrected as shown below:

In the title; abstract, line 1; Column 1, line 5; Column 1, line 8; Column 2, line 4; Claim 1, line 37; and Claim 2, line 40; please delete "(4-fluorophenylanilino)" and substitute therefor: "(4-fluorophenylamino)"

Signed and sealed this 14th day of January 1975.

(SEAL)
Attest:

McCOY M. GIBSON JR.
Attesting Officer

C. MARSHALL DANN
Commissioner of Patents

FORM PO-1050 (10-69)